United States Patent
Wang et al.

(10) Patent No.: US 9,547,914 B2
(45) Date of Patent: Jan. 17, 2017

(54) TECHNIQUES FOR FEATURE EXTRACTION

(71) Applicant: Google Inc., Mountain View, CA (US)

(72) Inventors: Zhiyu Wang, Beijing (CN); Edward Y. Chang, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 406 days.

(21) Appl. No.: 14/169,610

(22) Filed: Jan. 31, 2014

(65) Prior Publication Data

US 2014/0147039 A1 May 29, 2014

Related U.S. Application Data

(63) Continuation of application No. PCT/CN2011/077855, filed on Aug. 1, 2011.

(51) Int. Cl.
| | |
|---|---|
| *G06K 9/00* | (2006.01) |
| *G06T 7/40* | (2006.01) |
| *G06K 9/62* | (2006.01) |
| *G06K 9/46* | (2006.01) |

(52) U.S. Cl.
CPC ......... *G06T 7/408* (2013.01); *G06K 9/00684* (2013.01); *G06K 9/4619* (2013.01); *G06K 9/4652* (2013.01); *G06K 9/4671* (2013.01); *G06K 9/623* (2013.01); *G06K 9/4623* (2013.01)

(58) Field of Classification Search
CPC ....................................... G06K 9/4619–9/4628
See application file for complete search history.

(56) References Cited

U.S. PATENT DOCUMENTS

| | | |
|---|---|---|
| 6,711,287 B1 | 3/2004 | Iwasaki |
| 7,733,350 B2 | 6/2010 | Lefebvre et al. |
| 8,457,400 B2 | 6/2013 | Wu et al. |
| (Continued) | | |

FOREIGN PATENT DOCUMENTS

| | | |
|---|---|---|
| CN | 101573730 A | 11/2009 |
| CN | 102138162 A | 7/2011 |

OTHER PUBLICATIONS

Serre, Thomas, et al. "Robust object recognition with cortex-like mechanisms." IEEE transactions on pattern analysis and machine intelligence 29.3 (2007): 411-426.*

(Continued)

*Primary Examiner* — Chan Park
*Assistant Examiner* — Raphael Schwartz
(74) *Attorney, Agent, or Firm* — Remarck Law Group PLC

(57) ABSTRACT

A computer-implemented technique for feature extraction includes obtaining an electronic image of an object and performing an edge detection algorithm on the electronic image. The technique further includes performing an edge pooling algorithm and sampling the electronic image edge patches, color patches and texture patches. A set of patches is selected from the edge patches, color patches and texture patches by selecting an ($i^{th}$+1) patch to be within the set of patches based on a Euclidean distance from an $i^{th}$ patch of the set of patches for each of the set of edge patches, the set of color patches and the set of texture patches. A part selection algorithm and a part pooling algorithm is performed to obtain parts that are registered to the object.

15 Claims, 5 Drawing Sheets

(56) References Cited

U.S. PATENT DOCUMENTS

2002/0031268 A1  3/2002  Prabhakar et al.
2005/0058350 A1  3/2005  Dugan et al.

OTHER PUBLICATIONS

Supplementary European Search Report dated Feb. 19, 2016 for European Patent Application No. 11870265.3, 7 pages.
Nang, Z. et al., "A Deep-Learning Model-Based and Data-Driven Hybrid Architecture for Image Annotation," Proceedings of the International Workshop On Very-Large-Scale Multimedia Corpus, Mining and Retrieval, VLS-MCMR '10, Jan. 1, 2010, pp. 13-18.
Hauptmann, A. et al., "Informedia at TRECVID 2003: Analyzing and Searching Broadcast News Video," Proceedings of (VIDEO) TREC 2003 (Twelfth Text Retrieval Conference), Gaithersburg, MD, Nov. 17-21, 2003, 14 pages.
Martin, D. et al., "Learning to Detect Natural Image Boundaries Using Local Brightness, Color, and Texture Cues," IEEE Transactions on Pattern Analysis and Machine Intelligence, vol. 26, No. 5, May 2004, pp. 530-549.
PCT International Search Report and Written Opinion dated Dec. 8, 2011 for PCT International Application No. PCT/CN2011/077855, 8 pages.
Zhao, T. et al, "Feature Selection Based-on Genetic Algorithm for CBIR," 2008 Congress on Image and Signal Processing, pp. 495-499.

\* cited by examiner

TECHNIQUES FOR FEATURE EXTRACTION

CROSS-REFERENCE TO RELATED APPLICATION

This application is a continuation of International Application No. PCT/CN2011/077855, filed on Aug. 1, 2011. The entire disclosure of the above application is incorporated herein by reference.

FIELD

The present disclosure generally relates to feature extraction from electronic images and, more particularly, to techniques that utilizes both a model-based algorithm and a data-driven algorithm for performing feature extraction on electronic images.

BACKGROUND

This section provides background information related to the present disclosure which is not necessarily prior art.

Feature extraction provides the foundation for many image processing tasks, for example, image classification and object recognition. Traditional feature extraction techniques can be classified as a model-based approach, a data-driven approach or some combination of a model-based and data-driven approach. Model-based approaches of feature extraction typically utilize rules, obtained from training images, to map features to objects in unknown images. Data-driven approaches of feature extraction typically utilize a relatively large number of training images from which to derive feature-to-object mapping examples. Combination or "hybrid" approaches utilize a combination of rules and feature-to-object mapping examples.

The present disclosure provides for a feature extraction technique that utilizes both model-based and data-driven approaches to obtain improved performance, for example, in image classification and object recognition.

SUMMARY

This section provides a general summary of the disclosure, and is not a comprehensive disclosure of its full scope or all of its features.

In various embodiments of the present disclosure, a computer-implemented technique is disclosed. The technique includes obtaining an electronic image of an object and performing an edge detection algorithm on the electronic image to obtain a first set of edges corresponding to the object. The technique further includes performing an edge pooling algorithm on the first set of edges to obtain a second set of edges, the second set of edges being less in number than the first set of edges. The electronic image is sampled to obtain a set of edge patches based on the second set of edges, a set of color patches and a set of texture patches. The technique also includes selecting a set of patches from the set of edge patches, the set of color patches and the set of texture patches by selecting the selecting an $(i^{th}+1)$ patch to be within the set of patches when a Euclidean distance between an $i^{th}$ patch of the set of patches and the $(i^{th}+1)$ patch is greater than or equal to a Euclidean distance between the $i^{th}$ patch and all other patches. Additionally, the technique includes performing a part selection algorithm on the selected set of patches to obtain a first set of parts and performing a part pooling algorithm on the first set of parts to obtain a second set of parts. The second set of parts is less in number than the first set of parts. The part pooling algorithm includes: (i) dividing each of the first set of parts into a number of subparts; and (ii) performing a MAX operation on each of the subparts. The technique further includes registering the second set of parts to the object.

In various embodiments of the present disclosure, a feature extraction is disclosed. The feature extraction technique includes an edge detection module that determines a first set of edges corresponding to an object of an electronic image. The feature extraction technique also includes an edge pooling module that determines a second set of edges from the first set of edges, where the second set of edges being less in number than the first set of edges. Additionally, the feature extraction technique includes an edge patch sampling module that samples a set of edge patches based on the second set of edges, a color patch sampling module that samples a set of color patches from the electronic image, and a texture patch sampling module that samples a set of texture patches from the electronic image. A patch selection module of the feature extraction technique selects a set of patches from the set of edge patches, the set of color patches and the set of texture patches by selecting the selecting an $(i^{th}+1)$ patch to be within the set of patches when a Euclidean distance between an $i^{th}$ patch of the set of patches and the $(i^{th}+1)$ patch is greater than or equal to a Euclidean distance between the $i^{th}$ patch and all other patches. The feature extraction technique further includes a part selection module that determines selects a first set of parts based on the selected set of patches. Also, the feature extraction technique includes a part pooling module that determines a second set of parts based on the first set of parts, the second set of parts being less in number than the first set of parts, wherein the part pooling algorithm includes: (i) dividing each of the first set of parts into a number of subparts; and (ii) performing a MAX operation on each of the subparts. In addition, the feature extraction technique includes an object registration module that registers the second set of parts to the object.

In various embodiments of the present disclosure, a computer-implemented technique is disclosed. The technique includes obtaining an electronic image of an object and performing an edge detection algorithm on the electronic image to obtain a first set of edges corresponding to the object. The technique further includes performing an edge pooling algorithm on the first set of edges to obtain a second set of edges, the second set of edges being less in number than the first set of edges. The electronic image is sampled to obtain a set of edge patches based on the second set of edges, a set of color patches and a set of texture patches. Additionally, the technique includes selecting a set of patches from the set of edge patches, the set of color patches and the set of texture patches by selecting an $(i^{th}+1)$ patch to be within the set of patches based on a Euclidean distance from an $i^{th}$ patch of the set of patches for each of the set of edge patches, the set of color patches and the set of texture patches. The technique also includes performing a part selection algorithm on the selected set of patches to obtain a first set of parts and performing a part pooling algorithm on the first set of parts to obtain a second set of parts. The second set of parts is less in number than the first set of parts. Further, the technique includes registering the second set of parts to the object.

In various embodiments of the present disclosure, a feature extraction is disclosed. The feature extraction technique includes an edge detection module that determines a first set of edges corresponding to an object of an electronic image. The feature extraction technique also includes an edge pooling module that determines a second set of edges from the first set of edges, where the second set of edges being less in number than the first set of edges. Additionally, the feature extraction technique includes an edge patch sampling module that samples a set of edge patches based on the second set of edges, a color patch sampling module that samples a set of color patches from the electronic image, and a texture patch sampling module that samples a set of texture patches from the electronic image. A patch selection module of the feature extraction technique selects a set of patches from the set of edge patches, the set of color patches and the set of texture patches by selecting an ($i^{th}$+1) patch to be within the set of patches based on a Euclidean distance from $i^{th}$ an patch of the set of patches for each of the set of edge patches, the set of color patches and the set of texture patches. The feature extraction technique further includes a part selection module that determines selects a first set of parts based on the selected set of patches. Also, the feature extraction technique includes a part pooling module that determines a second set of parts based on the first set of parts, where the second set of parts is less in number than the first set of parts. In addition, the feature extraction technique includes an object registration module that registers the second set of parts to the object.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
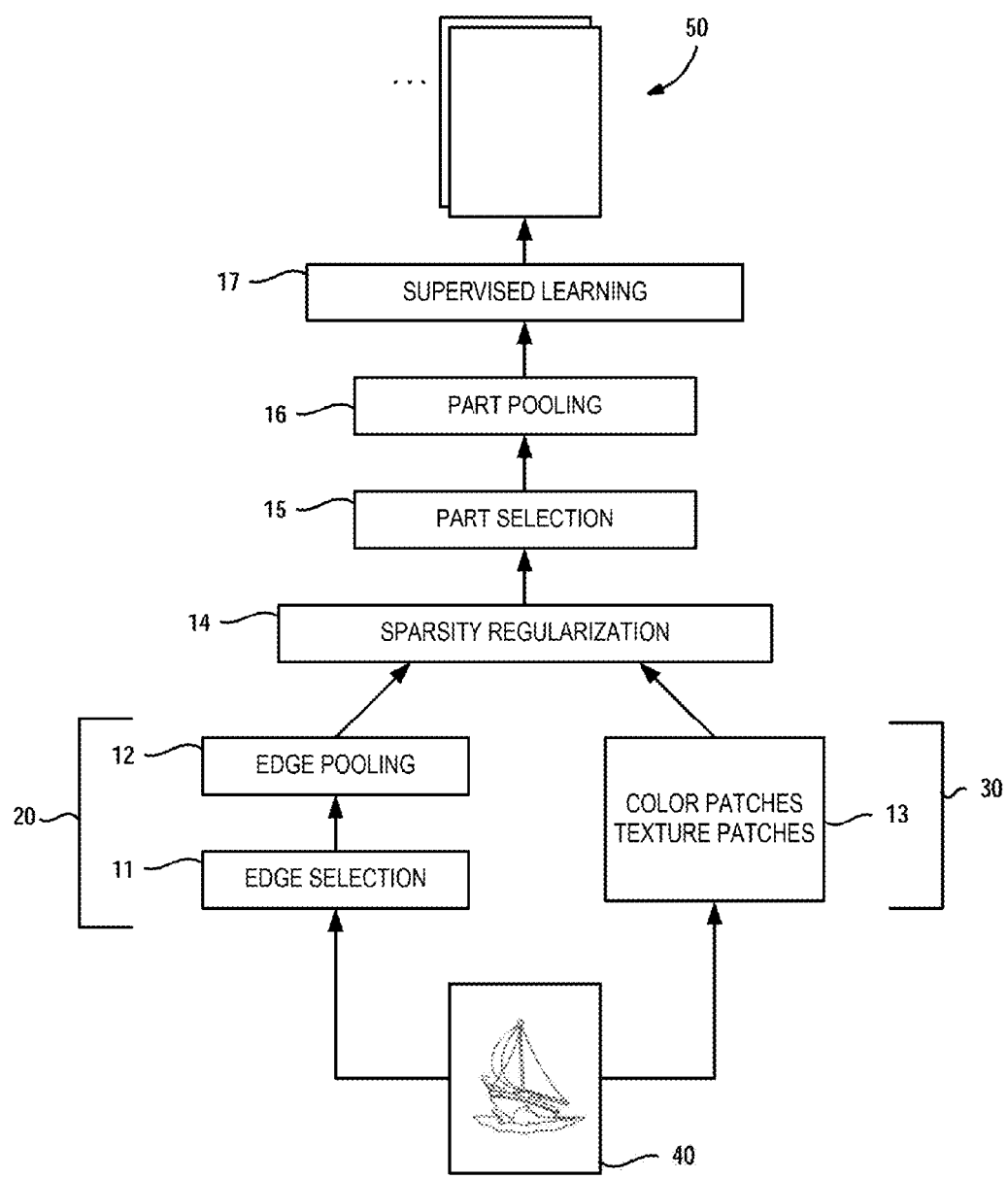
FIG. 1 is a block diagram representing an example feature extraction architecture according to some embodiments of the present disclosure.

Referring now to FIG. 1, a block diagram representing an example feature extraction architecture 10 according to some embodiments of the present disclosure is illustrated. The feature extraction architecture 10 provides a technique for performing feature extraction on at least one electronic image 40 to obtain a set of features 50 that are mapped or registered with one or more objects shown in the electronic image 40. The example feature extraction architecture 10 includes edge selection 11, edge pooling 12, color and texture patches 13, sparsity regularization 14, part selection 15, part pooling 16 and supervised learning 17. Edge selection 11 and edge pooling 12 make up a portion of a model-based algorithm 20 for feature extraction, while color and texture patches 13 make up a data-driven algorithm 30 for feature extraction. Each of the elements of the feature extraction architecture 10 is described more fully below.

Figure 2:
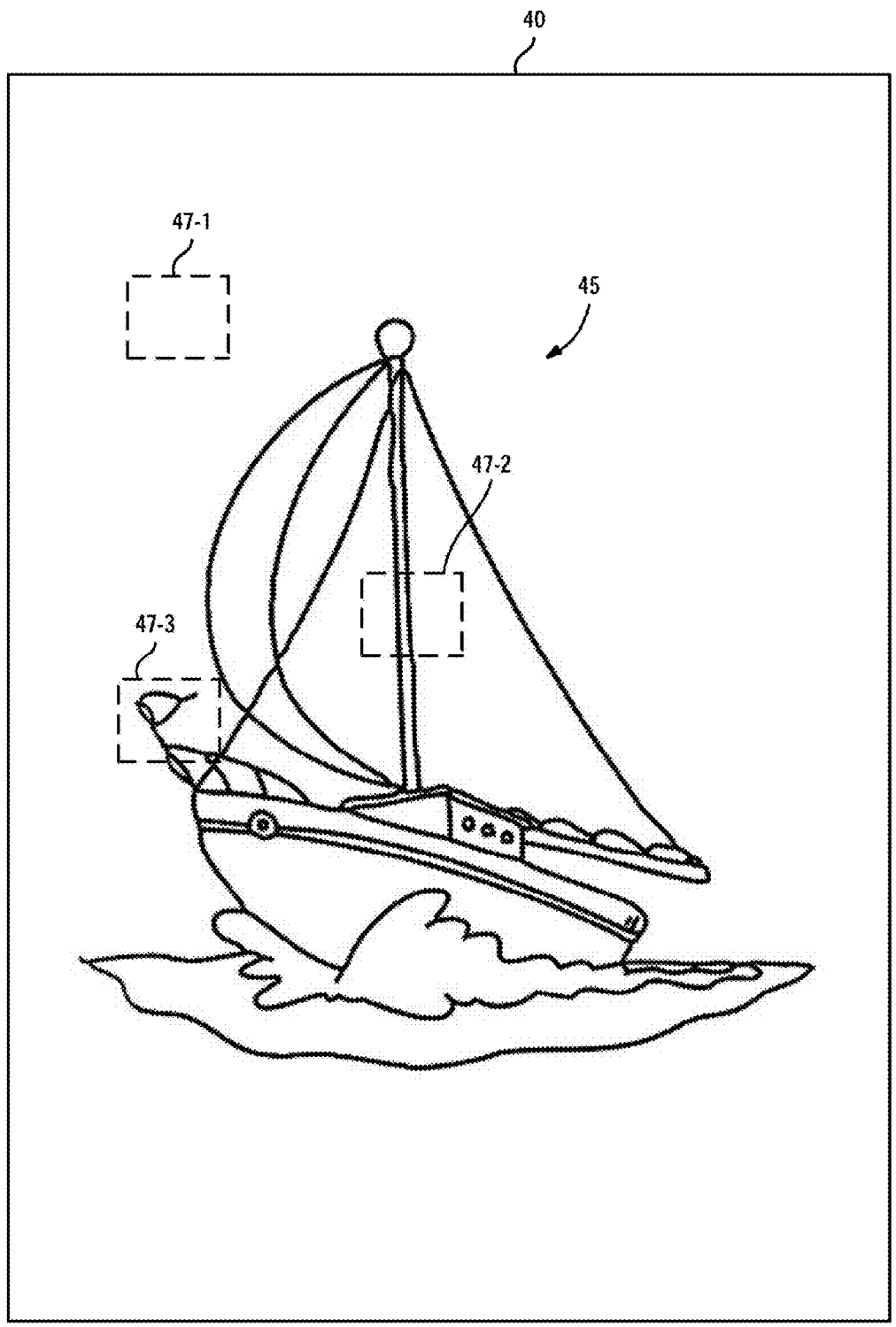
FIG. 2 is an illustration of an example electronic image 40 upon which a feature extraction technique according to some embodiments of the present disclosure will be performed.

Referring now to FIG. 2, an example electronic image 40 upon which feature extraction will be performed is shown. The electronic image 40 includes a representation of an object 45, which in this example is a sailboat sailing on water. Feature extraction can detect various features (edges, colors, textures, etc.) from the electronic image 40, which can then be mapped (or registered) to the object 45. These features can then be compared to features in unknown images to detect and classify unknown objects therein.

Figure 3:
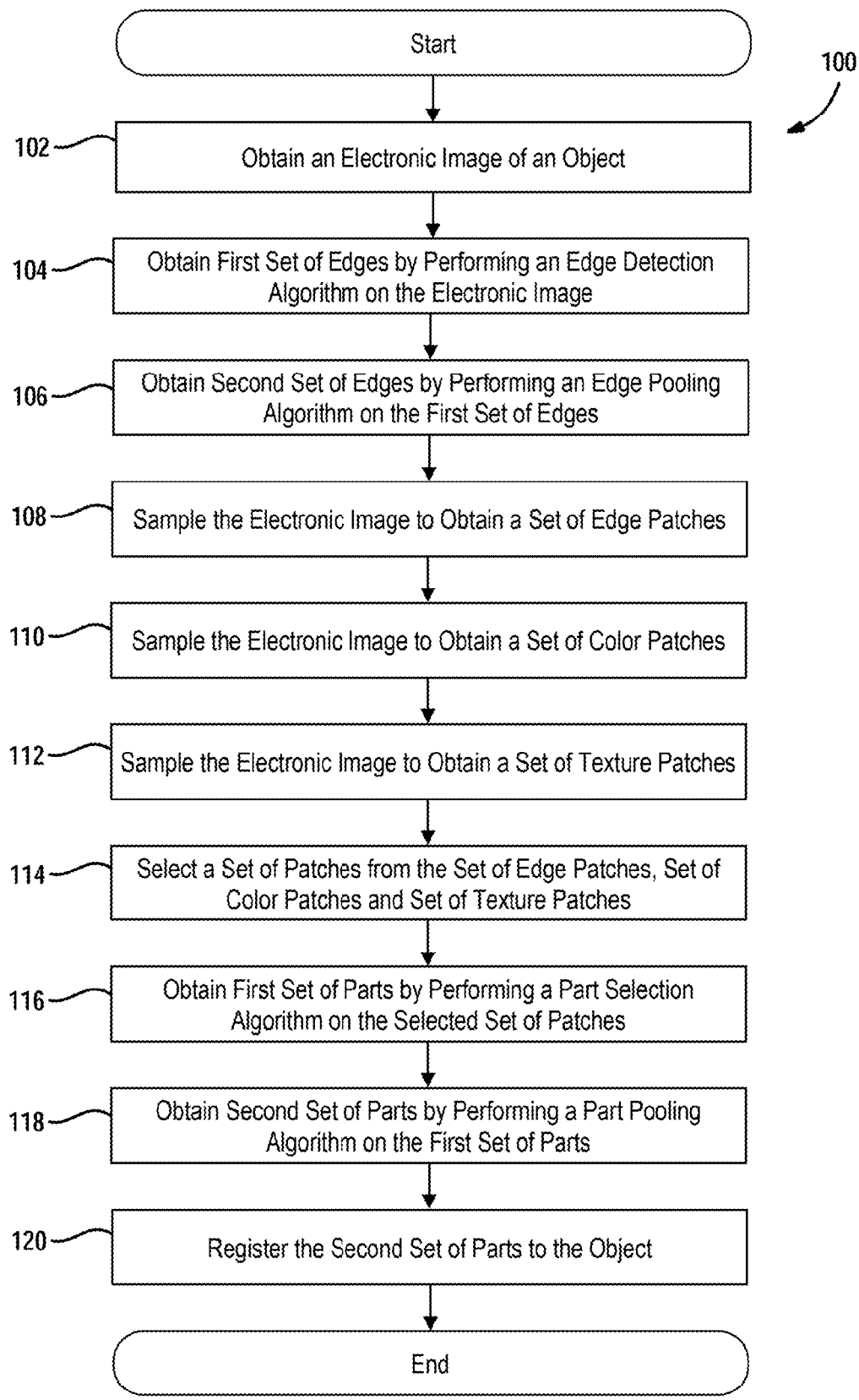
FIG. 3 is a flowchart of an example feature extraction technique according to various embodiments of the present disclosure.

Referring now to FIG. 3, an example feature extraction technique 100 according to various embodiments of the present disclosure is illustrated. It should be appreciated that the feature extraction technique 100 can be performed by a suitably configured computer or other computing device, such as the example feature extraction technique 200 illustrated in FIG. 4. At step 102, an electronic image 40 is obtained. The electronic image 40 is a digital image that can be obtained in any number of ways, for example, from an electronic storage medium (database, hard drive, FLASH memory device, etc.), from a digital camera and/or from a digital scanner. The electronic image 40 can include a representation of an object 45 (such as the sailboat shown in FIG. 2) to which the technique 100 will register features. For an electronic image 40 that will be used to train a technique for image classification, object recognition, etc. the object 45 can be classified by a user. In the illustrated example of electronic image 40 shown in FIG. 2, a user may classify the object 45 as "sailboat," "boat," "ship" and/or other appropriate classification.

An edge detection algorithm is performed on the electronic image 40 at step 104 in order to obtain a first set of edges that correspond to the object 45. Any one of various edge detection algorithms can be utilized at step 104. For example only, in various embodiments of the present disclosure a Gabor filter may be utilized to obtain the first set of edges. In these examples, the electronic image 40 is transmitted into a gray-value image "I." Different sizes of Gabor filters may be applied as the convolution kernels to process the gray-value image I, using the equation:

$$F_s(x, y) = \exp\left(-\frac{x_0^2 + \gamma^2 y_0^2}{2\sigma^2}\right) \times \cos\left(\frac{2\pi}{\lambda}x_0\right), \text{ where}$$

$$x_0 = x\cos\theta + y\sin\theta \text{ and } y_0 = -x\sin\theta + y\cos\theta,$$

wherein $\gamma$ is the aspect ratio, $\theta$ is the orientation (which takes values 0°, 45°, 90°, and 135°), $\sigma$ is the effective width, $\lambda$ is the wave length and $F_s(x,y)$ is the value of the 2D matrix formed by the Gabor filter at position (x,y). The matrix size (s×s) produced by the Gabor filter ranges from 7×7 to 37×37 pixels in intervals of two pixels. The output of the edge detection algorithm (that is, the first set of edges) is produced by 2D convolutions ("conv2") of the electronic image 40 and a number of Gabor filters according to the equation:

$$I_{S\_edge(i_b, i_s, i_f)} = \text{conv2}(I, F_{i_F}), \text{ where}$$

$$i_F = (i_b \times n_s + i_s) \times n_f + i_f,$$

where $I_{S\_edge(i_b,i_s,i_f)}$ is the first set of edges, and $n_b$, $n_s$ and $n_f$ are constants standing for the number of bands, scales and filters.

The technique proceeds to step 106 at which an edge pooling algorithm is performed on the first set of edges in order to obtain a second set of edges that correspond to the object 45. The edge pooling algorithm is performed to discard noisy and redundant edges from the first set of edges. Thus, the second set of edges will be less in number than the first set of edges once such noisy/redundant edges are removed. In various embodiments, the edge pooling algorithm utilizes a MAX operation to obtain the second set of edges from the first set of edges. For example only, the MAX operation can utilize the equation:

$$I_{edge(i_b,i_f)}(x, y) = \max_{i_s \in v_s, m \in N(x,y)} I_{S\_edge(i_b,i_s,i_f)}(x_m, y_m),$$

where $(x_m, y_m)$ stands for edge detection results at position $(x,y)$ and $I_{edge,*_{i_b,mi_f}}(x,y)$ is the second set of edges. The MAX operation can be taken over the two scales within the same spatial neighborhood of the same orientation.

The electronic image 40 is sampled to obtain a set of edge patches (step 108), a set of color patches (step 110) and a set of texture patches (step 112). A "patch" is a region of pixels sampled at a specific position of the electronic image 40 in multiple resolutions and at four orientations. Example patches 47-1, 47-2 and 47-3 from the electronic image 40 are represented in FIG. 2. An object 45 can be fully expressed if enough representative patches from the object 45 have been sampled. At step 114, a set of patches from the set of edge patches, the set of color patches and the set of texture patches is selected. These steps 108, 110, 112 and 114 correspond to sparsity regularization 14 of the feature extraction architecture 10 illustrated in FIG. 1. Sparsity regularization 14 is where the model-based 20 and data-driven 30 algorithms for feature extraction are merged.

Any one or more of various sampling techniques can be utilized at steps 108, 110 and 112 to obtain the set of edge patches, color patches and texture patches, respectively. For example only, edge patches can be any number of pixels that are sampled from the second set of edges. Color patches can be sampled at various resolutions (coarse, medium, fine, etc.) and can include any amount of color information features, including but not limited to color, color histograms, color means (in H, S and V channels), color variances (in H, S and V channel), and shape characteristics such as elongation and spread. Texture patches can be sampled and can include any amount of texture information, including but not limited to structure, scale, orientation and shape characteristics such as elongation and spread.

In various embodiments, the set of patches is selected based on a greedy algorithm that uses Euclidean distance to select a subset of the patches from each of the sets of edge patches, color patches and texture patches to obtain the set of patches (step 114). For example only, if the set of patches includes z patches, a first patch of the z patches can be selected randomly or by any other technique and each subsequent patch (up to and including the $z^{th}$ patch) can be selected based on a Euclidean distance from the previous patch (that is, the second patch is based on the first patch, the third patch is based on the second patch, and so on). To express this generically, in various embodiments step 114 selects the $(i^{th}+1)$ patch to be within the set of patches based on a Euclidean distance from an $i^{th}$ patch.

In some embodiments, each patch (excepting the first) can be selected by determining the patch that: (1) is not already in the set of patches, and (2) is the "farthest" from the immediately preceding patch according to Euclidean distance. That is, to express this generically, step 114 selects the $(i^{th}+1)$ patch to be within the set of patches if a Euclidean distance between the $i^{th}$ patch and the $(i^{th}+1)$ patch is greater than or equal to a Euclidean distance between the $i^{th}$ patch and all other patches not already within the set of patches.

The technique continues to step 116 at which a part selection algorithm is performed on the set of patches to obtain a first set of parts. Each of the first set of parts can describe larger regions of the object 45 than the edge patches, color patches and texture patches. In some embodiments, the first set of parts is obtained by examining the selected patches in each of the sets of patches obtained from a plurality of electronic images 40-1, 40-2 . . . 40-n that are used to train the technique. If the selected patches occur frequently enough within sets of patches, these patches can be selected as parts that are representative of the object 45. One manner of performing this examination is, for each training image being examined, attempting to match its set of patches to all stored set(s) of patches for previously analyzed training images.

In some embodiments, the selection of parts from the set of patches can be based on the equation:

$$I_{S\_part(i_b,i_p)} = \exp(-\beta \|X_{i_b} - P_{i_p}\|_2),$$

where $\beta$ is the sharpness of the tuning, $P_{i_p}$ is one of the patches of the set of patches, $X_{i_b}$ is a transformation of the $I_{edge(i_b,i_f)}$ with all orientations merged to fit the size of $P_{i_p}$. In this example, $n_b$ measurements of the image for each prototype patch are obtained. Thus, the total number of measurements that this part-selection step makes is the number of patches ($n_p$) in the set of patches multiplied by the number of bands ($n_p \times n_b$).

At step 118, a part pooling algorithm is performed on the first set of parts to obtain a second set of parts. The part pooling algorithm is performed to discard noisy and redundant parts from the first set of parts. Thus, the second set of parts will be less in number than the first set of parts once such noisy/redundant parts are removed. Similar to the edge pooling algorithm described above (step 106), the part pooling algorithm can utilize a MAX operation to obtain the second set of parts from the first set of parts.

In some embodiments, each of the first set of parts is divided into four (or any number of) subparts, that is, the matrix corresponding to each part within the first set of parts is divided into four (or any number of) sub-matrices. The MAX operation can be performed on these subparts, which provide for increased retention of information related to the parts (for example, spatial information).

The technique continues to step 120 at which the second set of parts is registered (or mapped) to the object 45. This registration (or mapping) can be based on the degree of matching of the second set of parts with sampled parts of the object 45 in the plurality of electronic images 40-1, 40-2 . . . 40-n utilized to train the technique. For example only, the registration of the second set of parts to the object 45 can be performed by supervised learning, such as Support Vector Machines ("SVM's") or the like.

One of the advantages of the example technique 100 is its ease of scalability to processing large-scale datasets. The features that are extracted by the technique 100 described above are independent from one another. Thus, the analysis and application of these extracted features can be performed in a distributed computing environment. Furthermore, as additional patches, parts and other information is obtained (for example, from obtaining and analyzing additional training images), these patches, parts and information can be simply added to the sets of patches, parts, etc. to improve performance of the technique.

Figure 4:
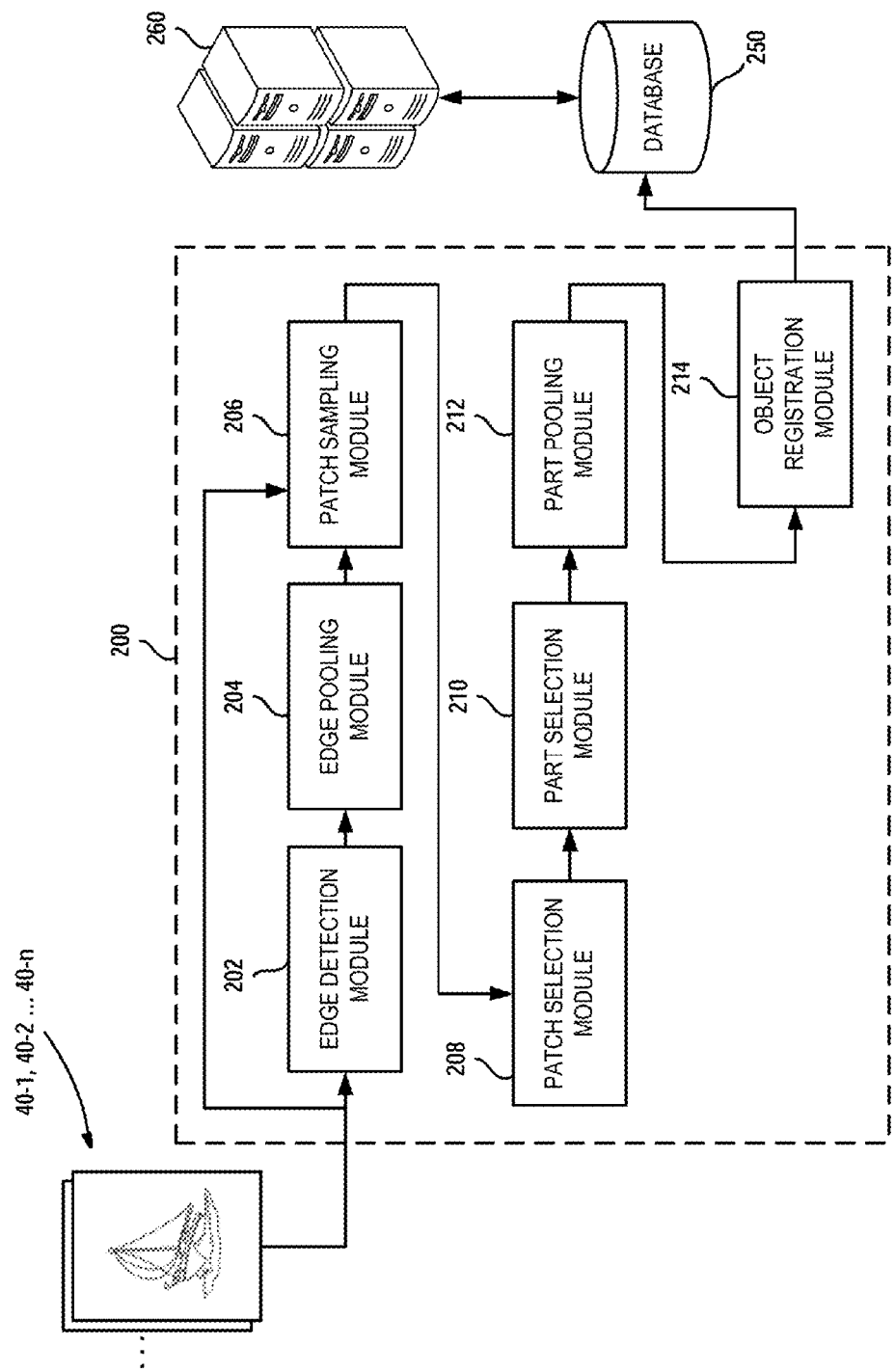
FIG. 4 is a block diagram of an example feature extraction technique according to various embodiments of the present disclosure.
Figure 5:
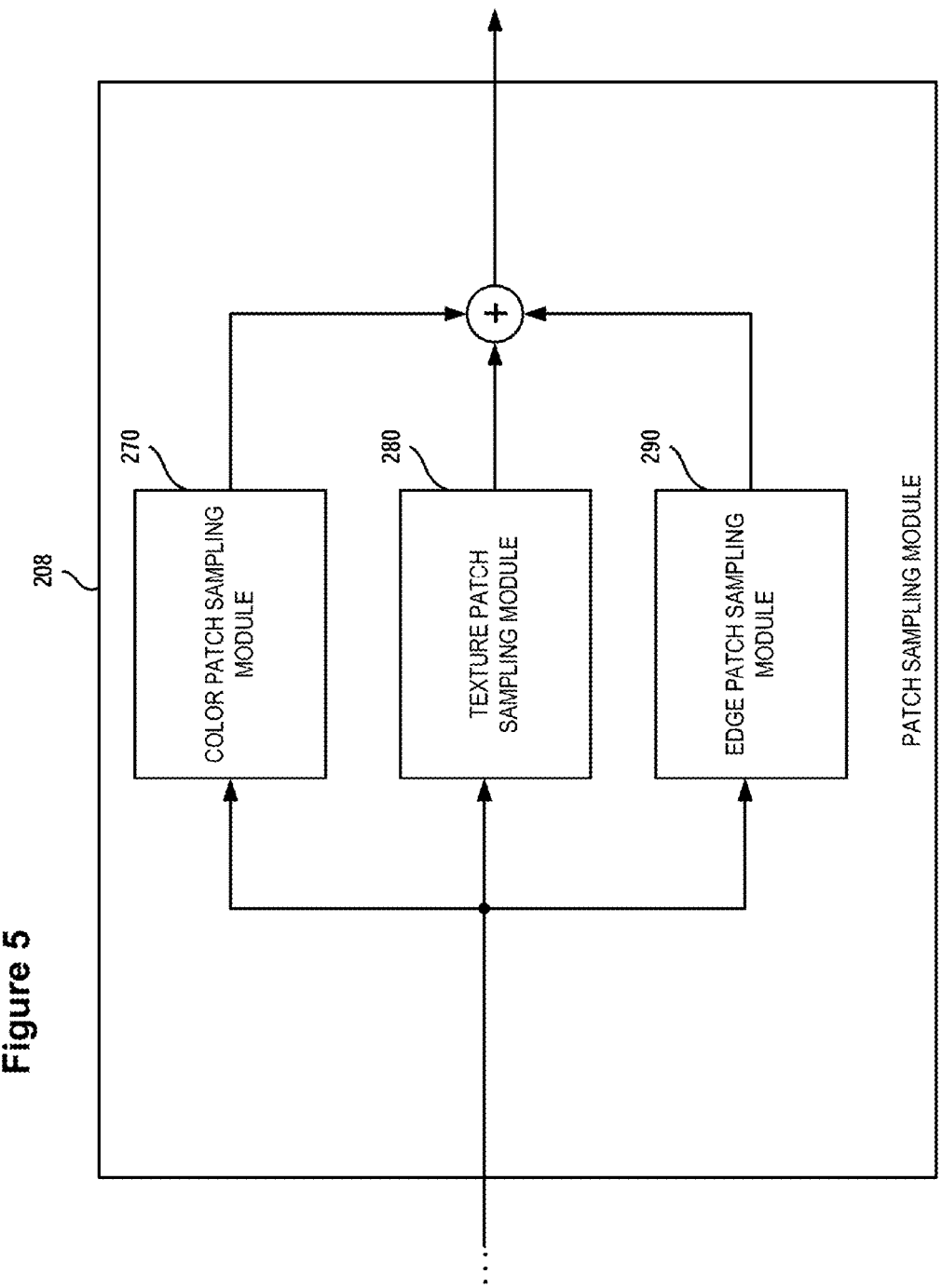
FIG. 5 is a block diagram of an example of a patch sampling module of the feature extraction technique illustrated in FIG. 4.

Referring now to FIGS. 4-5, an example feature extraction technique 200 according to various embodiments of the present disclosure is illustrated. The feature extraction technique 200 includes an edge detection module 202 that determines a first set of edges corresponding to an object 45 of an electronic image 40, for example, by one or more of the techniques described above in relation to technique step 104. The edge detection module 202 outputs the first set of edges to an edge pooling module 204. The edge pooling module 204 determines a second set of edges from the first set of edges. The edge pooling module 204 can perform any of various edge pooling algorithms, including but not limited to those described in relation to step 106 above.

A patch sampling module 206 receives the second set of edges from the edge pooling module 204, as well as a plurality of electronic images 40-1, 40-2 . . . 40-n that are used to train the technique 200. The patch sampling module 206 includes a color patch sampling module 270, a texture patch sampling module 280 and an edge patch sampling module 290, as shown in FIG. 5. For ease of illustration, in FIG. 5 arrow 205 indicates the input of the second set of edges from the edge pooling module 204, as well as the input of the plurality of electronic images 40-1, 40-2 . . . 40-n, into the patch sampling module 208. The color patch sampling module 270 samples a set of color patches from the electronic image(s) 40-1, 40-2 . . . 40-n based on the second set of edges. Similarly, the texture patch sampling module 280 samples a set of texture patches, and the edge patch sampling module 290 samples a set of edge patches, from the electronic image(s) 40-1, 40-2 . . . 40-n based on the second set of edges. The set of color patches, the set of texture patches and the set of edge patches are then provided to a patch selection module 208.

The patch selection module 208 selects a set of patches from the set of edge patches, the set of color patches and the set of texture patches, for example, by any of the techniques/algorithms described above in regard to step 114. The set of patches is then provided to a part selection module 210, which determines a first set of parts based on the set of patches. Any of the techniques of part selection described above (step 116) can be utilized by the part selection module 210 to determine the first set of parts.

A part pooling module 212 receives the first set of parts from the part selection module 210 and determines a second set of parts based on the first set of parts (for example, by any of the techniques described above in relation to step 118). The part pooling module 212 outputs the second set of parts to an object registration module 214, which registers the second set of parts to the object 45, as described above. The registration information associating the second set of parts to the object 45 can be stored for future use on any electronic storage medium, e.g., a database 250. The database 250 can be operably connected to a computing device 260 (a personal computer, server, server bank, etc.) such that the computing device 260 can utilize the registration information and other information stored on the database 250, for example, to provide image classification and object recognition for unknown images. Further, one skilled in the art will appreciate that, although it is illustrated as being separate from the computing device 260, the feature extraction technique 200 can be a wholly or partially integrated with the computing device 260.

Example embodiments are provided so that this disclosure will be thorough, and will fully convey the scope to those who are skilled in the art. Numerous specific details are set forth such as examples of specific components, devices, and techniques, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The technique steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, bytecode and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required technique steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
    obtaining an electronic image of an object;
    performing an edge detection algorithm on the electronic image to obtain a first set of edges corresponding to the object;
    performing an edge pooling algorithm on the first set of edges to obtain a second set of edges, the second set of edges being less in number than the first set of edges;
    sampling the electronic image to obtain a set of edge patches based on the second set of edges;
    sampling the electronic image to obtain a set of color patches from the electronic image;
    sampling the electronic image to obtain a set of texture patches from the electronic image;
    selecting a set of patches from the set of edge patches, the set of color patches and the set of texture patches by selecting an $(i^{th}+1)$ patch to be within the set of patches when a Euclidean distance between an $i^{th}$ patch of the set of patches and the $(i^{th}+1)$ patch is greater than or equal to a Euclidean distance between the $i^{th}$ patch and all other patches;
    performing a part selection algorithm on the selected set of patches to obtain a first set of parts;
    performing a part pooling algorithm on the first set of parts to obtain a second set of parts, the second set of parts being less in number than the first set of parts, wherein the part pooling algorithm includes: (i) dividing each of the first set of parts into a number of subparts; and (ii) performing a MAX operation on each of the subparts; and
    registering the second set of parts to the object.

2. A computer-implemented method, comprising:
    obtaining an electronic image of an object;
    performing an edge detection algorithm on the electronic image to obtain a first set of edges corresponding to the object;
    performing an edge pooling algorithm on the first set of edges to obtain a second set of edges, the second set of edges being less in number than the first set of edges;
    sampling the electronic image to obtain a set of edge patches based on the second set of edges;
    sampling the electronic image to obtain a set of color patches from the electronic image;
    sampling the electronic image to obtain a set of texture patches from the electronic image;

selecting a set of patches from the set of edge patches, the set of color patches and the set of texture patches by selecting an ($i^{th}$+1) patch to be within the set of patches based on a Euclidean distance from an $i^{th}$ patch of the set of patches for each of the set of edge patches, the set of color patches and the set of texture patches;

performing a part selection algorithm on the selected set of patches to obtain a first set of parts;

performing a part pooling algorithm on the first set of parts to obtain a second set of parts, the second set of parts being less in number than the first set of parts;

registering the second set of parts to the object.

3. The computer-implemented method of claim 2, wherein selecting the ($i^{th}$+1) patch based on the Euclidean distance from the $i^{th}$ patch comprises selecting the ($i^{th}$+1) patch if the Euclidean distance between the $i^{th}$ patch and the ($i^{th}$+1) patch is greater than or equal to a Euclidean distance between the $i^{th}$ patch and all other patches.

4. The computer-implemented method of claim 2, wherein performing the part pooling algorithm on the first set of parts to obtain the second set of parts includes performing a MAX operation on the first set of parts.

5. The computer-implemented method of claim 4, wherein the MAX operation comprises: (i) dividing each of the first set of parts into a number of subparts; and (ii) performing a MAX operation on each of the subparts.

6. The computer-implemented method of claim 5, wherein the number of subparts is 4.

7. The computer-implemented method of claim 2, wherein registering the second set of parts to the object is performed by supervised learning.

8. The computer-implemented method of claim 2, wherein performing the edge pooling algorithm on the first set of edges to obtain the second set of edges includes performing a MAX operation on the first set of edges.

9. A feature extraction system, comprising:

an edge detection module that determines a first set of edges corresponding to an object of an electronic image;

an edge pooling module that determines a second set of edges from the first set of edges, the second set of edges being less in number than the first set of edges;

an edge patch sampling module that samples a set of edge patches based on the second set of edges;

a color patch sampling module that samples a set of color patches from the electronic image;

a texture patch sampling module that samples a set of texture patches from the electronic image;

a patch selection module that selects a set of patches from the set of edge patches, the set of color patches and the set of texture patches by selecting an ($i^{th}$+1) patch to be within the set of patches based on a Euclidean distance from an $i^{th}$ patch of the set of patches for each of the set of edge patches, the set of color patches and the set of texture patches;

a part selection module that determines selects a first set of parts based on the selected set of patches;

a part pooling module that determines a second set of parts based on the first set of parts, the second set of parts being less in number than the first set of parts; and an object registration module that registers the second set of parts to the object.

10. The feature extraction system of claim 7, wherein selecting the ($i^{th}$+1) patch based on the Euclidean distance from the $i^{th}$ patch comprises selecting the ($i^{th}$+1) patch when the Euclidean distance between the $i^{th}$ patch and the ($i^{tb}$+1) patch is greater than or equal to a Euclidean distance between the $i^{th}$ patch and all other patches.

11. The feature extraction system of claim 9, wherein performing the part pooling algorithm on the first set of parts to obtain the second set of parts includes performing a MAX operation on the first set of parts.

12. The feature extraction system of claim 11, wherein the MAX operation comprises: (i) dividing each of the first set of parts into a number of subparts; and (ii) performing a MAX operation on each of the subparts.

13. The feature extraction system of claim 12, wherein the number of subparts is 4.

14. The feature extraction system of claim 9, wherein registering the second set of parts to the object is performed by supervised learning.

15. The feature extraction system of claim 9, wherein performing the edge pooling algorithm on the first set of edges to obtain the second set of edges includes performing a MAX operation on the first set of edges.

* * * * *